United States Patent
May (10) Patent No.: US 9,383,429 B2
(45) Date of Patent: Jul. 5, 2016

(54) SYSTEM AND METHOD FOR DETERMINING GEO LOCATION OF A TARGET USING LOCUS OF EMITTER POSITIONS (LEP)

(71) Applicant: RATHEON APPLIED SIGNAL TECHNOLOGY, INC., Waltham, MA (US)

(72) Inventor: William May, Ellicott City, MD (US)

(73) Assignee: Raytheon Applied Signal Technology, Inc., Waltham, MA (US)

( * ) Notice: Subject to any disclaimer, the term of this patent is extended or adjusted under 35 U.S.C. 154(b) by 649 days.

(21) Appl. No.: 13/654,155

(22) Filed: Oct. 17, 2012

(65) Prior Publication Data

US 2014/0104112 A1  Apr. 17, 2014

(51) Int. Cl.
  *G01S 3/02* (2006.01)
  *G01S 5/02* (2010.01)
  *G01S 5/12* (2006.01)
  *G01S 11/04* (2006.01)

(52) U.S. Cl.
  CPC ... *G01S 5/02* (2013.01); *G01S 5/12* (2013.01); *G01S 11/04* (2013.01)

(58) Field of Classification Search
  CPC .............. G01S 5/02; G01S 5/12; G01S 11/04
  USPC .......................................................... 342/450
  See application file for complete search history.

(56) References Cited

U.S. PATENT DOCUMENTS

| 3,886,553 | A * | 5/1975 | Bates ............................ 342/465 |
| 4,806,936 | A * | 2/1989 | Williams et al. .............. 342/126 |
| 5,526,001 | A * | 6/1996 | Rose et al. ..................... 342/442 |
| 5,629,707 | A * | 5/1997 | Heuvel et al. .............. 342/357.2 |
| 5,936,571 | A * | 8/1999 | Desjardins ............... 342/357.59 |
| 7,570,214 | B2 * | 8/2009 | Smith et al. ................... 342/463 |
| 2008/0088508 | A1 * | 4/2008 | Smith ........................... 342/453 |
| 2008/0231494 | A1 * | 9/2008 | Galati ............................. 342/37 |
| 2011/0057839 | A1 * | 3/2011 | Seifer et al. ................... 342/418 |
| 2012/0133550 | A1 * | 5/2012 | Benninghofen et al. .... 342/25 A |
| 2013/0271324 | A1 * | 10/2013 | Sendonaris et al. .......... 342/450 |

* cited by examiner

*Primary Examiner* — Frank J McGue
(74) *Attorney, Agent, or Firm* — Lewis Roca Rothgerber Christie LLP (57) ABSTRACT

A system and method for determining geo position of a target by an aircraft, including: (a). electronically receiving navigation data related to the aircraft and multilateration information related to the target; (b). electronically calculating a locus of emitter positions (LEP) curve from the received navigation data and multilateration information; (c). repeating steps (a) and (b), as the aircraft moves toward or away from the target; (d). electronically accumulating, in a computer storage medium, the calculated LEP curves; and (e). electronically determining a position that is closest to all the accumulated LEP curves to establish a position of the target.

19 Claims, 7 Drawing Sheets

FIG. 7A

SYSTEM AND METHOD FOR DETERMINING GEO LOCATION OF A TARGET USING LOCUS OF EMITTER POSITIONS (LEP)

FIELD OF THE INVENTION

The present invention relates to a system and method for determining geo location of a target using locus of emitter positions (LEP).

BACKGROUND

Multilateration is a navigation technique that utilizes measurement of the difference in distance to one or more emitters (stations) at known locations that broadcast signals at known times. However, this measurement of the difference in distance yields an infinite number of locations that satisfy the measurement. A hyperbolic curve is formed when these possible locations are plotted. A second measurement needs to be taken from a different pair of emitters (stations) to produce a second curve which intersects with the first curve and thus locate the exact location along the hyperbolic curve. When the two or more curves are compared, a small number of possible locations are identified to obtain a "fix". Multilateration is a common technique in radio navigation systems.

A line of bearing (LOB) measurement is based on a direction from a point to a target (emitter). An estimate of a target's location can be found by combining two different LOB measurements to obtain a fix. The segment between the two LOB sensors is referred to as the "baseline," and the distance to the target from the center of the baseline is the "range."

A relatively accurate measure of the physical relationship between the sensors and the target is the angle formed by the rays connecting the target to each sensor. For targets at ranges in excess of one baseline, the angle descriptor (which decreases) more accurately describes the off-boresight case than the range-to-baseline ratio (which does not decrease). However, measurement errors of the target location become increasingly substantial, when the angle formed by the line segments connecting the sensors to the target is small. For example, if the estimate of a target's location is performed by an airborne platform, such as an aircraft, the platform (aircraft) has to be in a straight and level flight for the estimate to be accurate. This imposes a significant limitation of the aircraft and the environment, in which the target position is to be determined.

The shortcomings of the LOB algorithm have been somewhat addressed by using measurements made only during straight and level flight and a fixed standoff from the target. When fixes are calculated using data obtained under these constraints, the geo-fix may have a sufficient accuracy. However, the drawbacks are that the aircraft maneuvering must be tightly controlled when a geo-location fix is being attempted, and that measurements are dropped if the constraints of straight and level flight (for example, during turns) and/or standoff distance are not satisfied.

These drawbacks restrict how and when a conventional standoff RF geo-location system can be used. A common operational scenario is that when a target is detected, an initial geo-fix is computed, and the operator points a camera toward the target. Putting a camera on the target often requires turning and flying the aircraft closer toward the target. When this happens the aircraft is no longer flying broadside to the emitter in straight and level flight, so LOB measurements begin to exhibit the spirograph pattern.

A recent development in airborne geo-location is the introduction of near vertical direction finding (NVDF) systems. Unlike standoff direction finding (DF) systems, an NVDF system is looking down (as the name implies) from an aircraft, not sideways. Since the aircraft is looking down, NVDF has a much smaller field of view than a standoff system. On the other hand, NVDF systems provide two angles of arrival, and can provide instantaneous position estimates. Instantaneous measurements enable an NVDF system to track moving emitters. Since the operation and capabilities of NVDF and conventional standoff are quite different, they complement, rather than replace, one another.

SUMMARY OF THE INVENTION

The present invention utilizes a locus of emitter positions (LEP) approach, which produces valid geo-location results during the turns of the aircraft, and regardless of the distance to the target. The LEP approach works correctly regardless of aircraft attitude and position relative to the target. The aircraft need not be flown at a fixed standoff from the target (the location of which is assumed to be unknown), and can be climbing, turning or banking. A geo-location engine according to the present invention can use all available data, not just the data acquired during periods when attitude constraints are satisfied.

In some embodiments, the present invention is a method performed by one or more processors for determining geo position of a target by an aircraft. The method includes: (a). electronically receiving navigation data related to the aircraft and multilateration information related to the target; (b). electronically calculating a locus of emitter positions (LEP) curve from the received navigation data and multilateration information; (c). repeating steps (a) and (b), as the aircraft moves toward or away from the target; (d). electronically accumulating, in a computer storage medium, the calculated LEP curves; and (e). electronically determining a position that is closest to all the accumulated LEP curves to establish a position of the target.

In some embodiments, the present invention is a system for determining geo position of a target by an aircraft. The system includes: a receiver for receiving navigation data related to the aircraft and multilateration information related to the target; and one or more processors for calculating a locus of emitter positions (LEP) curve from the received navigation data and multilateration information. As the aircraft moves toward or away from the target, the receiver receives new navigation data and multilateration information and the processors calculate new LEP curves. The system further includes computer memory for accumulating the calculated LEP curves, wherein said one or more processors determine a position that is closest to all the accumulated LEP curves to establish a position of the target.

In some embodiments, the multilateration information comprises angle of arrival (AOA) information and the three-dimensional geometric model is a three-dimensional cone model. In some embodiments, the multilateration information comprises time difference of arrival (TDOA) information and the three-dimensional geometric model is a three-dimensional hyperboloid model.

The three-dimensional geometric model of the earth may be a sphere, an ellipsoid, or constructed from terrain data.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art. In some embodiments, the method of the present invention is executed by a geo-location engine 300, which includes one or more processors 302, memory 304, input/output logic 306 to receive and transmit data, and appropriate software and firmware, to transform measurements related to a target to an accurate geo-position of the target, as shown in FIG. 3A.

In some embodiments, the present invention is a method performed by one or more processors for determining geo position of a target by an aircraft. The present invention utilizes a more precise 3-D geometric model to improve the geo-fix accuracy. This new 3-D model takes into account the pitch and orientation of the airborne platform and does not require the airborne platform to be in a straight and level flight position when determining the position of the target.

Figure 1A:
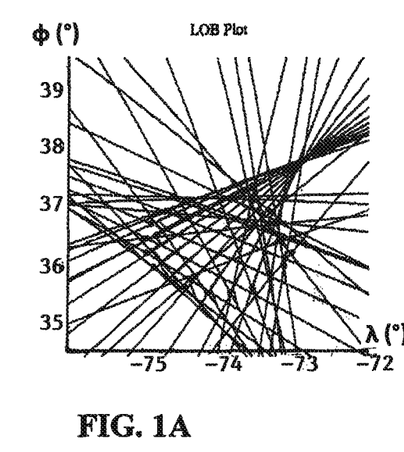
FIGS. 1A and 1B illustrate two airborne radio geo-location determination methods.
Figure 1B:
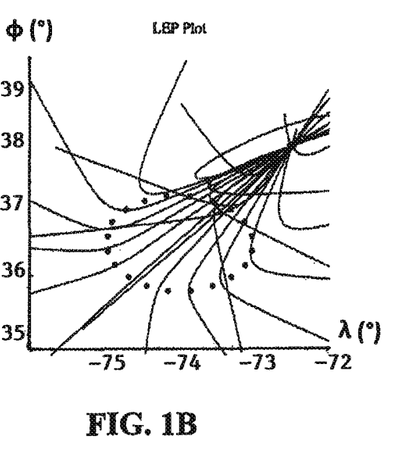

FIGS. 1A and 1B illustrate two airborne radio geo-location methods. FIG. 1A depicts the traditional LOB-based approach and FIG. 1B shows the new locus of emitter positions (LEP)-based approach. The large black dot is the actual emitter location and the smaller dots are locations where the measurements are made. As shown, when the aircraft is not flying straight and level, the LOB approach produces a spirograph pattern that doesn't converge on the target. However, the LEP approach produces curves, rather than lines, that intersect precisely on the target location. The effects seen in these figures are due to geometry, not error. Throughout this analysis, all angle of arrival (AOA) measurements are assumed to be error free. Furthermore, it is assumed that there is no measurement noise. These figures illustrate the problem that motivates the LEP geo-location approach.

Even though there are no measurement errors, the LOB lines fail to cross at a single point. The effects of altitude and attitude of the aircraft combine to create a so-called "spirograph" pattern. With no crossing at a single point, it is impossible to form a valid geo-location fix. This is inherent to using an incorrect geometric model for geo-location from the air.

However, as shown in FIG. 1B, the LEP curves (not lines) intersect at the correct location of the emitter. While it can't be seen in FIG. 1B, the curves are in three dimensions, bending with the surface of the earth.

In the context of the present invention, the term "locus" refers to the set of points that satisfy some geometric condition. The "locus of emitter positions" is then the set of possible emitter locations given some geometric conditions. For airborne geo-location, these conditions may be the angle of arrival measurement, the fact that the emitter is assumed to be on the ground, and aircraft position and attitude. If only the first condition is used, that is the angle of arrival measurement, the locus of emitter positions can be seen as a cone. The second condition, the fact that the emitter is on the surface of the earth, leads to intersecting the LEP cone with a sphere (or ellipsoid, or terrain data), that is a 3-D geometric model of the earth. The cone-surface intersection is a curve in three dimensions. The third condition, flight attitude, causes the intersection curve to undergo some complicated transformations.

Figure 2:
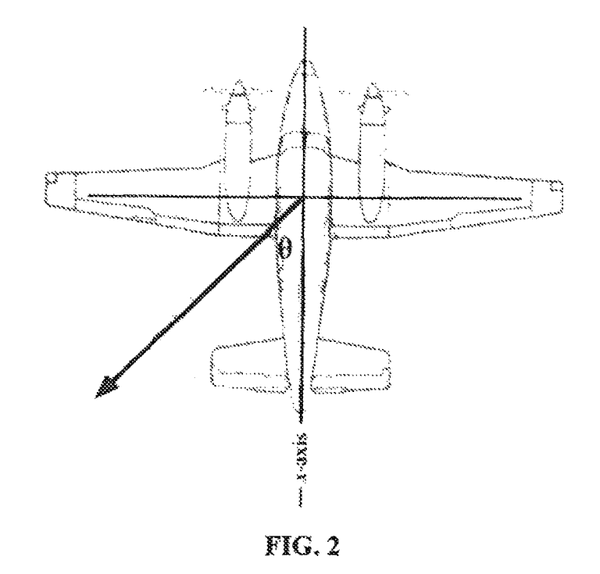
FIG. 2 is a top view illustration of two-dimensional direction finding where an emitter is detected relative to an aircraft's longitudinal axis, according a conventional method.

FIG. 2 is a top view illustration of two-dimensional direction finding where an emitter is detected at $\theta°$ relative to the aircraft longitudinal axis (the x-axis), according to a conventional method. As shown, in a standoff direction finding system, a measurement comprises of an angle of arrival (ADA) and navigation data (position, heading, pitch and roll). If the measurement is perfect, then it seems that one need only project the line onto the surface of the earth and extend the line to the radio horizon. The target emitter will be somewhere on that line. This is the concept of a LOB approach, as applied in conventional geo-location systems. If, in fact, the measurement is made from the surface of the earth, then this geometric model is correct.

Figure 3:
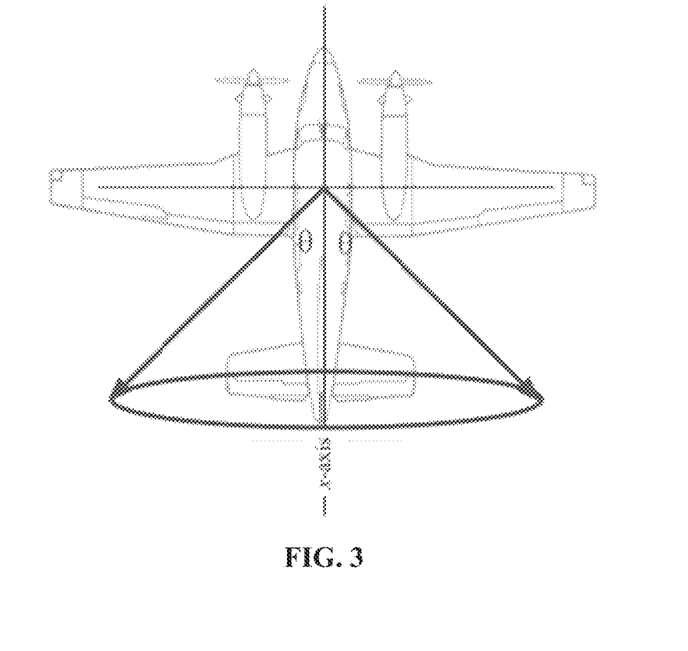
FIG. 3 is a top view illustration of a three-dimensional direction finding approach where an emitter is detected at $\theta°$ relative to the aircraft longitudinal axis, according to some embodiments of the present invention.
Figure 3A:
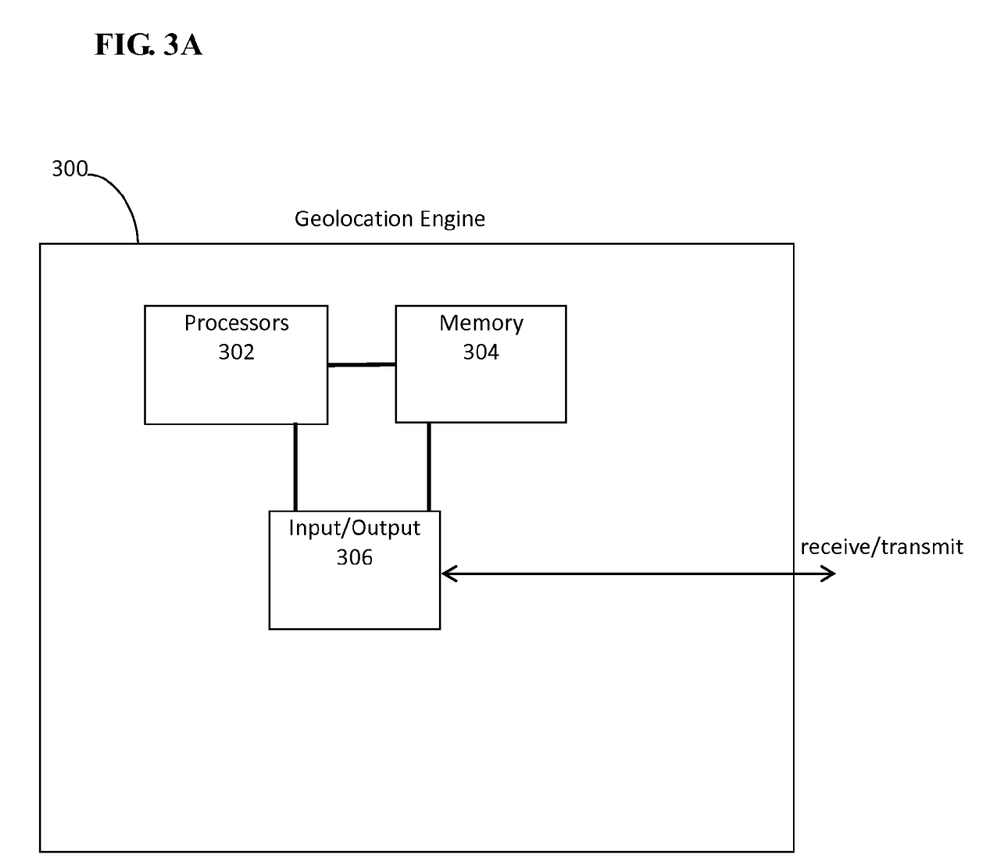
FIG. 3A is a simplified block diagram of a geolocation engine, according to some embodiments of the present invention.

FIG. 3 is a top view illustration of a three-dimensional direction finding approach where an emitter is detected at $\theta°$ relative to the aircraft longitudinal axis, according to some embodiments of the present invention. The second angle for the angle of arrival is unknown, therefore the emitter location can be any point on the parametric surface given in spherical coordinates by $(r; \theta; \phi)$, where $r \in |0; \partial)$ and $\theta \in |0; 360)$, that is, r goes from 0 to radio horizon, and $\theta$ goes from 0 to 360 degrees. This is the parametric form for a cone. It should be noted that although AOA and a 3-D cone geometric model is used to describe aspects of the present invention, the present invention is not limited to AOA and cone models. For example, other multilateration information, such as time difference of arrival (TDOA) information may be used to develop a three-dimensional geometric model. In the case of TDOA, the 3-D model is a three-dimensional hyperboloid model, instead of a 3-D cone model.

Referring back to FIG. 3, on an aircraft, the AOA is usually (but not always) a measurement relative to an axis of the body of the aircraft. Here, it is typically assumed that the AOA is measured relative to the longitudinal axis of the aircraft. Since only a single angle measurement is made in a 3-D coordinate system, the second angle is treated as an unknown. Therefore, the line must be swept through all possible values for the second angle. As depicted, the result is a cone in this example. If an azimuth-elevation coordinate system is used, then the AOA corresponds to azimuth, and the cone is formed by sweeping through all elevation angles. The apex of the cone is the aircraft, and the central axis of the cone is the reference axis used for measuring AOA. With no further information or constraints (and no measurement error), all that is known at this point is that the emitter lies somewhere on this cone. The half-angles are called the cone angle and denoted as α. The cone angle is a basic element of the LEP approach. There is usually a simple relationship between the cone angle and AOA. For example, the AOA may be measured relative to broadside, an emitter off the wing has AOA of 0 degrees. The cone angle is obtained from the AOA by adding or subtracting 90 degrees.

Although, the given examples mention that the AOA is measured relative to the longitudinal axis of the aircraft, it is also possible and within the scope of the present invention to measure the AOA relative to the wings of the aircraft, or a vertical axis.

Figure 4:
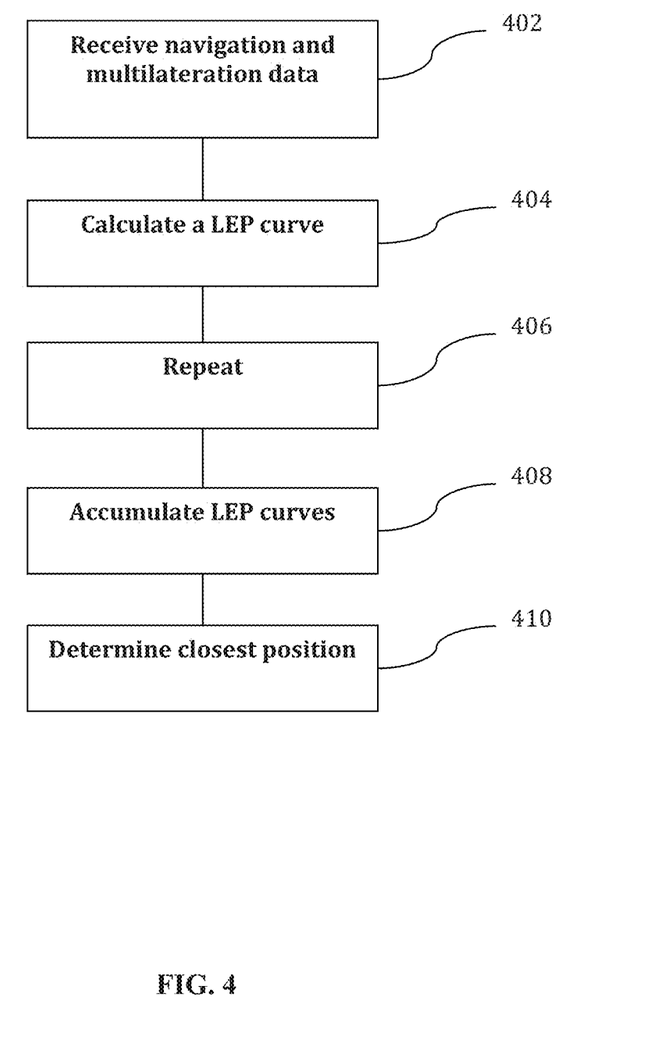
FIG. 4 is an exemplary process flow, executed by one or more processors, according to some embodiments of the present invention.

FIG. 4 is an exemplary process flow, executed by one or more processors, according to some embodiments of the present invention. As shown in block 402, navigation data related to the aircraft and multilateration information related to the target are received, for example by a receiver (e.g., input/output logic 306). The multilateration information may be in the form of AOA information, TDOA information, or the like. In block 404, the one or more processors (electronically) calculate an LEP curve from the received navigation data and multilateration information, also shown in FIG. 3. The processes in blocks 402 and 404 are repeated, as the aircraft moves toward or away from the target (emitter). Then, the one or more processors electronically accumulate, in a computer storage medium, the calculated LEP curves, in block 406. Subsequently, the invention determines a position that is closest to all the accumulated LEP curves to establish a position of the target, in block 408.

According to some embodiments, the calculation of the LEP curve includes electronically converting the received multilateration information to a three-dimensional geometric model using the received navigation data; and electronically intersecting the three-dimensional geometric model with a three-dimensional geometric model of the earth to obtain the LEP curve. In the cases that the multilateration information is in the form of AOA information, the three-dimensional geometric model of the AOA information is a 3-D cone, and in the cases that the multilateration information is in the form of TDOA information, the three-dimensional geometric model of the AOA information is a 3-D hyperboloid.

In some embodiments, the process of intersecting the three-dimensional geometric model with a three-dimensional geometric model of the earth, that is, restricting the LEP 3-D model to positions on the ground is accomplished by intersecting the cone with the surface of the earth. In these embodiments, the earth is assumed to be a sphere, although the invention is not limited to a spherical model of the earth and other 3-D models of the earth may be used. In the case of a spherical earth model, the LEP model can be represented by a quadratic (4th degree) polynomial.

The spherical earth model leads to accurate results. Nevertheless, if greater accuracy is needed one might use an ellipsoidal earth model. However, using an ellipsoidal earth model requires iterative solution methods that are computationally more complex and expensive than computations with the spherical earth model. If the additional accuracy is needed, a hybrid solution process can be used, where a rough solution is found using the spherical earth, and then refined using the ellipsoidal model. In some embodiments, digital terrain data may be used as the earth model. In these embodiments, an LEP geo-location fix may be computed using, for example, the spherical earth model, and then terrain data used to refine the fix.

Figure 5:
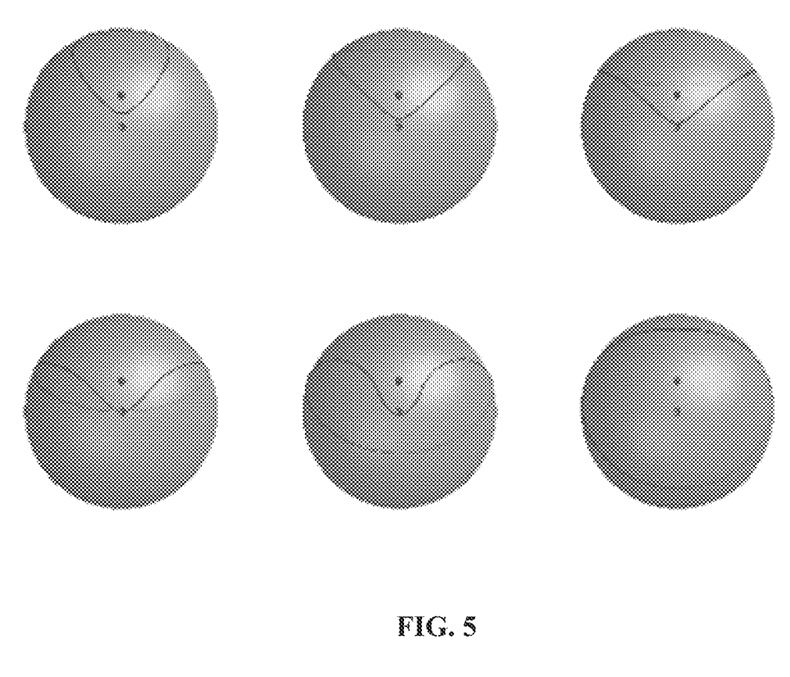
FIG. 5 depicts LEP points for a 45° AOA at pitch values increasing from 0° to 75° in 15° increments, according to some embodiments of the present invention.

FIG. 5 depicts LEP points for a 45° AOA at pitch values increasing from 0° to 75° in 15° increments, according to some embodiments of the present invention. Here, the aircraft is located at the red dot and the sphere is slightly translucent so that the LEP points on the far side are visible. FIG. 5 shows how the LEP changes as the aircraft pitch varies from 0° to 75°. In this figure the AOA is always 45°. An interesting phenomenon in this case is that the LEP can actually be two disjoint closed curves, one on the near side of the globe and one on the far side. For geo-location purposes, the curve on the near side are considered. In order to see an LEP with two components the aircraft needs to be flying nearly vertical, which is not a likely event.

After, a single LEP curve is derived from a single AOA measurement, the geo location engine employs multiple LEP curves to determine what point lies closest to all those curves. An example is shown in FIG. 1B and is discussed above. As mentioned before, in calculations of FIG. 1B, there are no measurement errors so the LEP curves unambiguously intersect at a single point. However, in practice, the LEP curves do not intersect at a single point, so the geo-fix needs to be the point that is "closest" to all (or most) of the LEP curves.

Figure 6A:
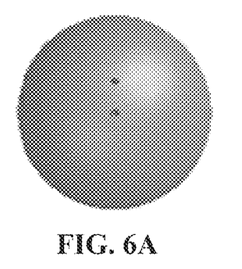
FIGS. 6A to 6F illustrate LEP curves for a 15° AOA at pitch values increasing from 0° to 75° in 15° increments, according to some embodiments of the present invention.
Figure 6B:
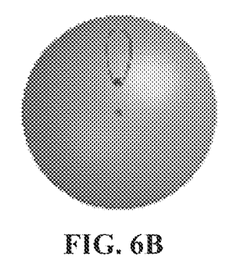
Figure 6C:
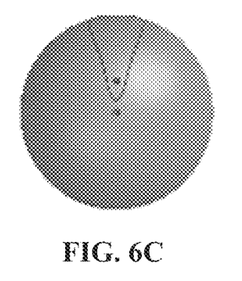
Figure 6D:
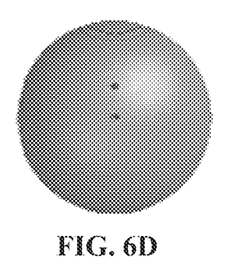
Figure 6E:
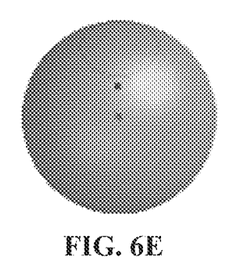
Figure 6F:
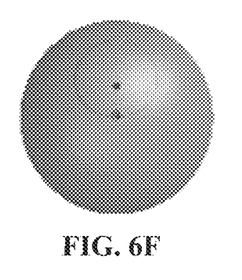

FIGS. 6A to 6F illustrate LEP curves for a 15° AOA at pitch values increasing from 0° to 75° in 15° increments, according to some embodiments of the present invention. In this example, the aircraft is located at the red dot. The sphere is slightly translucent so that the LEP points on the opposite side are visible. This is similar to FIG. 5, but shows a couple of new twists. First, with 0° pitch (FIG. 6A), the LEP curve misses the earth completely and there is no intersection. Second, at higher pitch values (FIGS. 6E and 6F), the LEP is composed of two disjoint curves. The first disjoint curve is on the near side of the earth and the second disjoint curve is on the far side. In FIG. 6E, the near side curve is too small to see, but in the FIG. 6F, it is visible underneath the virtual aircraft. For geo-location purposes, the part of the LEP curve on the far side of the earth is not relevant. This is usually not a practical concern since it requires an aircraft capable of vertical flight.

Although there are many possibilities, two meanings of "closest" are more important to consider. The distance can be measured in three dimensions using the standard Euclidean (straight line distance) metric. This is the familiar square root of the sums of squares. There are two drawbacks to using the Euclidean metric. One is that the solution will not necessarily lie on the surface of the earth. In fact, it will almost never lie on the surface of the earth. The second drawback is that the optimization procedure is performed over a three dimensional space, which is much more complex.

A second distance measure is the well known great circle distance measure. The great circle distance is taken between two points on the surface of the globe and is measured as the length of the shortest path along the surface of the globe between the two points. The generalization of great circle distance is known as geodesic distance. For general surfaces, calculation of a geodesic distance is quite difficult. However, for the sphere model (of the earth), there is a closed form expression, as shown by Equation B.3 in Appendix A. Using the great circle metric is computationally more expensive than the Euclidean metric. But, using this metric has the advantage that solutions always lie on the surface of the globe, and the optimization space is two dimensional (latitude and longitude), instead of three dimensional (x; y; z). The reduced search space for optimization tends to offset the greater complexity of the metric calculation. Both of the two above methods are applicable to the present invention.

Given the values that define an LEP, the LEP is represented internally as a vector-value parametric curve, in three-dimensions (Cartesian coordinates) or two-dimensions (spherical coordinates with r=1). The two forms represent the same curve, only the coordinate systems differ. The spherical coordinate representation would seem to be preferable, since the Cartesian coordinate form adds a third, redundant, coordinate. In practice, computations with the Cartesian representation may be more easily carried out.

An exemplary Cartesian coordinate system is the earth-centered earth fixed (ECEF) coordinate system used in geodesy. The ECEF origin is the center of the earth, the x-axis passes through latitude and longitude (0°; 0°), the y-axis passes through points with latitude and longitude (0°; 90°) and (0°; 270°), and the z-axis passes through the north and south poles. The (x; y)-plane is in the plane of the equator.

The LEP may first be calculated for the simplest case, 0° latitude and longitude, heading due north. This simple LEP is a function of only altitude, pitch and cone angle. To convert the simple LEP to general form, it is rotated using the given geodetic position and heading. The solution for the simple case is obtained by solving for the intersection between a cone and a sphere. That is, the equation $$x^2+y^2+z^2=1$$

represents a sphere with radius 1, centered at the origin. Also, the equation $$((x-r)\cos\theta - z\sin\theta)^2 + y^2 - \tan a((x-r)\sin\theta + z\cos\theta))^2 = 0 \quad (2)$$

represents a cone, where the vertex is at (r; 0; 0), the cone is tilted in the x; z plane by angle θ, and the cone angle is α. Note that the interior angle of the cone is actually 2α. The variable r is the normalized altitude of the aircraft. If the aircraft is a meters above the geoid, and the earth's radius at the aircraft's latitude is h meters then:

$$r = \frac{h+a}{h}$$

By substituting $y^2 = 1-x^2-z^2$ into Equation 2, solving for z, and simplifying, the following two functions are obtained:

$$z(x) = \tan\theta(r-x) \pm \frac{\cos a\sqrt{r^2 - 2rx + 1}}{\cos\theta} \quad (3)$$

While the LEP curve is closed, the functional form has two halves. Both halves are needed for geo-location computations. The complete parametric vector function representing the LEP is:

$$lep(x)\begin{pmatrix} x \\ \sqrt{1-x^2-z(x)^2} \\ z(x) \end{pmatrix} \quad (4)$$

In order to derive the general form of the LEP the vector in Equation (4) is rotated by the heading and rotated to the desired geodetic coordinates:

$$lep(x) = \begin{pmatrix} \cos\lambda & -\sin\lambda & 0 \\ \sin\lambda & \cos\lambda & 0 \\ 0 & 0 & 1 \end{pmatrix}\begin{pmatrix} \cos\phi & 0 & -\sin\phi \\ 0 & 1 & 0 \\ \sin\phi & 0 & \cos\phi \end{pmatrix}$$

$$\begin{pmatrix} 1 & 0 & 0 \\ 0 & \cos\psi & \sin\psi \\ 0 & -\sin\psi & \cos\psi \end{pmatrix}\begin{pmatrix} x \\ \sqrt{1-x^2-z(x)^2} \\ z(x) \end{pmatrix}$$

where ψ is heading, φ and λ are latitude and longitude. Solving this for x, y, and Z yields:

$x=(\cos\lambda\sin\psi\sin\phi-\sin\lambda\cos\psi)(-\rho\cos\alpha\sec\theta=\tan\theta(r-x))^2=x^2+1)-(\sin\lambda\sin\psi+\cos\lambda\cos\psi\sin\phi)(\rho\cos\alpha\sec\theta+\tan\theta(r-x))+x\cos\lambda\cos\phi$ $y=(\cos\lambda\cos\psi+\sin\lambda\sin\psi\sin\phi)(-(\rho\cos\alpha\sec\theta+\tan\theta(r-x))^2-x^2+1)+(\cos\lambda\sin\psi-\sin\lambda\cos\psi\sin\phi)(\rho\cos\alpha\sec\theta+\tan\theta(r-x))+x\sin\lambda\cos\phi$ $z=-\sin\psi\cos\phi(-(\rho\cos\alpha\sec\theta+\tan\theta(r-x))^2-x^2+1)+\cos(\psi)\cos\phi(\rho\cos\alpha\sec\theta+\tan\theta(r-x))+x\sin\phi$ Where $\rho=\sqrt{r^2-2rx+1}$.

The LEP function can also be computed in spherical coordinates as:

$$lep(x) = \begin{pmatrix} \tan^{-1}\left(\frac{x\sin\phi + \rho_1\cos\phi}{\sqrt{v^2 + \omega_1^2}}\right) & \tan^{-1}\left(\frac{\cos\lambda v + \sin\lambda\omega_1}{-\sin\lambda v + \cos\lambda\omega_1}\right) \\ \tan^{-1}\left(\frac{x\sin\phi + \rho\cos\phi}{\sqrt{v_1^2 + \omega^2}}\right) & \tan^{-1}\left(\frac{\cos\lambda v_1 + \sin\lambda\omega}{-\sin\lambda v_1 + \cos\lambda\omega}\right) \end{pmatrix}$$

Where $\tau = \sqrt{1 + r^2 - 2rx}$ $\sigma = \sqrt{1 - x^2 - ((-r+x)\tan\theta + \tau\cos\alpha\sec\theta)^2}$ $\xi = (-r+x)\tan\theta + \tau\cos\alpha\sec\theta$ $v = \xi\sin\psi + \sigma\cos\psi$ $v_1 = \xi\sin\psi + \sigma\cos\psi$ $\rho = \xi\cos\psi + \sigma\sin\psi$ $\rho_1 = \xi\cos\psi + \sigma\cos\psi$ $\omega = x\cos\phi - \rho\sin\phi$ $\omega_1 = x\cos\phi - \rho\sin\phi$ Here, each matrix row corresponds to latitude and longitude for a piece of the LEP. The two rows represent the two segments of the LEP curve. One of the problems with the representation in spherical coordinates is that the function cannot be differentiated easily.

Figure 7A:
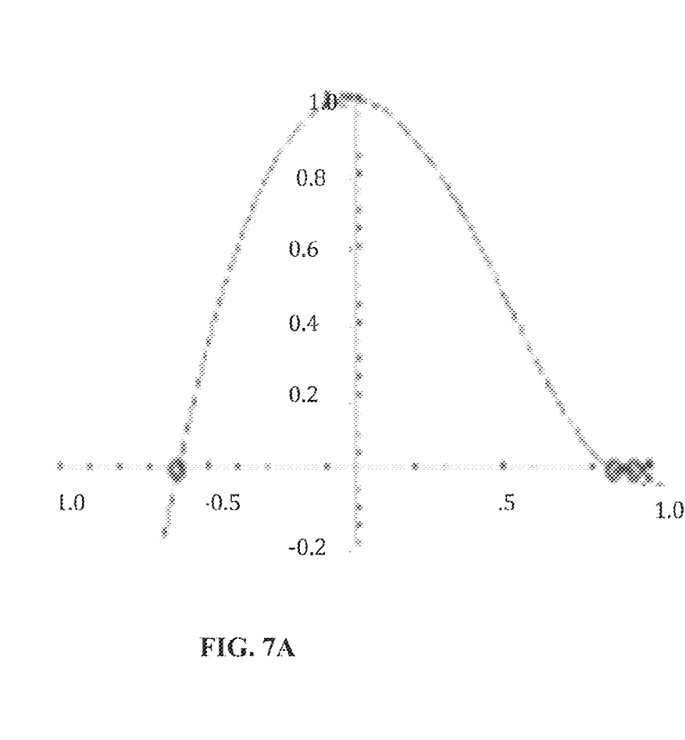
FIGS. 7A and 7B shows an example of the LEP parameter range, according to some embodiments of the present invention.
Figure 7B:
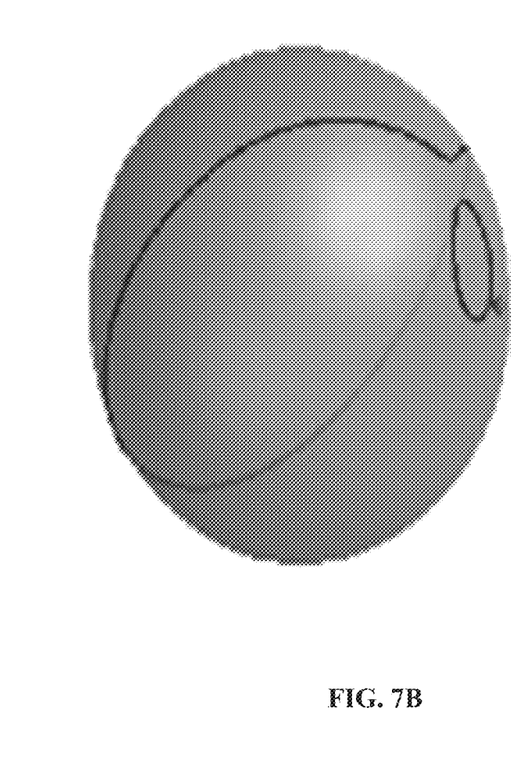

FIGS. 7A and 7B shows an example where the LEP parameter range is made up of two intervals, (−0:6060; 0:8705) and (0:9366; 0:9989). These correspond to two disjoint closed curves on the sphere, seen in FIG. 7A. In this example, the AOA is 45° and pitch is 70°. That is, the aircraft must be flying close to vertical in order for there to be two disjoint curves. Note in Equation (4) either y or z can be complex if the argument for their square root function is less than zero. Complex values for the LEP indicate that the LEP doesn't contact the sphere for the associated values of x. This can happens if the pitch of the aircraft, altitude, and the angle of arrival are such that the cone fails to intersect the earth. For example, if the angle of arrival is close to 0 and the aircraft is nose up the cone will project into space, never touching the ground. An obvious constraint is that the argument of the square root in Equation 2.3 be positive:

$r^2 2rx+1 \geq 0$

Or equivalently, $$x \leq \frac{r^2+1}{2r}$$
$$x \leq \frac{r}{2} + \frac{1}{2}.$$

If the aircraft is flying at 10,000 feet ASL then r is approximately 1:00048, and x is constrained to be less than a number slightly larger than 1. The constraint on the parameter for z is easy to compute, but unfortunately it is useless. The argument to the square root component of y in Equation 2.4 leads to the more important condition:

$$0 \leq 1 - x^2 - z^2(x)$$
$$x^2 \leq 1 - z^2(x)$$
$$-\sqrt{1-z^2(x)} \leq x \leq +\sqrt{1-z^2(x)}$$
$$-1 \leq x \leq 1$$

By expanding the expression for y(x) in Equation (4) we find that the parameter range needs to be limited to $$0 \leq 2 \cos \alpha \tan \theta \sec \theta (r-x)\rho - \cos^2\alpha \sec^2\theta \rho^2 - \tan^2\theta(r-x)^2 - x^2 + 1 \quad (8)$$

With $\rho = \sqrt{r^2 - 2rx + 1}$.

In order to find the ranges where the inequality is satisfied, we first solve for x as an equality. In that case, Equation (8) is a quartic equation, and the possible roots can be solved for symbolically:

$$x_k = \frac{1}{2}\left(r\cos(2\tau) + r \pm \sqrt{2}\sqrt{\sin^2\tau(2 - r^2\cos(2\tau) - r^2)}\right) \quad (9)$$
$$= r\cos^2\tau \pm \sin\tau\sqrt{1 - r^2\cos^2\tau}$$

where $\tau = \alpha \pm \theta$. Since there are two independent choices of $\pm$, one for $\tau$ and one for $\sqrt{2}$, this expression can produce four distinct values of $x_k$. This is due to the fact that, while a quartic equation will always have four zeros, some may be complex (complex conjugate pairs) and/or some may be repeated. Values of $x_k$ may be complex or the value of Equation (8) for particular $x_k$ may not equal zero. These complications are easily dealt with by evaluating Equation (8) for the real valued $x_k$ and verifying that the results are both real and zero (within machine precision) in each case.

Given a set $x_k$ values the remaining step is to evaluate Equation (8) within each interval bounded by the $x_k$ to determine whether the expression is positive or negative. An LEP may be composed of two disjoint curves, such as shown in FIG. 1. In this case, there are two intervals for the parameter. This only occurs if the aircraft pitch is near vertical, which is unlikely in most operations.

Note also, that for the purposes of LISP geo-location the parameter values of interest are those that very close to 1.0,
since these are the LEP points closest to the aircraft. In FIG. 1, the small curve near the aircraft (the red sphere) was generated by the parameter interval (0.9366; 0.9989):

To summarize, the LEP limit computation begins by computing the set of values $$x = \{r\cos^2\tau_1 + \sin\tau_1\sqrt{1 - r^2\cos^2\tau_1},$$
$$r\cos^2\tau_2 + \sin\tau_2\sqrt{1 - r^2\cos^2\tau_2},$$
$$r\cos^2\tau_1 - \sin\tau_1\sqrt{1 - r^2\cos^2\tau_1},$$
$$r\cos^2\tau_2 - \sin\tau_2\sqrt{1 - r^2\cos^2\tau_2}\} \quad (10)$$

Where $\tau_1 = \alpha + \theta$, and $\tau_2 = \alpha - \theta$.

The set x may be a superset of the zeros of y, or the set may contain complex roots. Therefore the set has to be checked. First, all complex values in the set x are removed. Then the elements are evaluated at $$y = 1 - x^2 - \frac{(1 + r^2 - 2rx)\cos^2\alpha\sec^2\theta + 2(r-x)}{\sqrt{1 + r^2 - 2rx\cos\alpha\sec\theta\tan\theta - (r-x)^2\tan^2\theta}} \quad (11)$$

to determine which of the elements are actually zeros of y(x). Finally, duplicates (double roots) are removed.

A key component of the geo-fix calculation is computing the distance from a test point to the LEP:

$$d(lep, (\phi, \lambda)) = \min_x \|lep(x) - (\phi, \lambda)\|, \quad (12)$$

where $(\phi; \lambda)$ is the latitude and longitude of the test point and lep(x) is the LEP function (a space curve). This calculation may be implemented in a suitable computing language. There are many norms that might be used to solve Equation (12). The three important candidates may be the Euclidean norm, spherical geodesic distance (great circle distance), and the ellipsoidal geodesic distance.

Euclidean distance is likely be the most tractible, however it can produce geo-fixes that are not on the surface of the earth, and it will generally be the least accurate of the three candidates. Although the ellipsoidal geodesic distance calculation is the most accurate, it is based on an iterative algorithm that is expensive to compute.

In some embodiments, the spherical geodesic distance is used. By using this norm, the solutions will be guaranteed to be on the surface of the (spherical) earth, and the norm can be computed reasonably quickly. An important consideration is floating point accuracy. The easily derived computation using the $\cos^{-1}$ (x) function is prone to unacceptable rounding errors when two points are close together. There exists an algorithm that is accurate for all point pairs on the sphere. See, Section A.3, in Appendix A for additional details.

Note that the slight inaccuracy of using the spherical earth versus the ellipsoidal earth can be largely rectified by a unique approach. Unless the aircraft is living very high (nearly in orbit), the geo-location region of interest is small relative to the entire earth. By using the ellipsoidal radius for the latitude of the region of interest, computations based on the spherical model will be very close to the exact results. This approach may easily be incorporated into the algorithm.

Once the metric has been determined and the LEP limits computed, the distance algorithm becomes a standard minimization problem in one-dimension. There are a number of algorithms, known as line search algorithms, that are available to solve this problem. For example, the known golden section search works well, although it tends to be slow. In some embodiments, Brent's minimization algorithm is used, which incorporates the golden section search and successive parabolic interpolation. Brent's algorithm is as robust as the golden section search, and is somewhat faster. Brent's algorithm is described in "R. P. Brent. Algorithms for Minimization Without Derivatives. Prentice-Hall, New Jersey, 1973," the entire contents of which are hereby expressly incorporated by reference.

A geo-location fix is computed from multiple measurements, such as those illustrated in FIG. 1. The geo-fix algorithm finds the point on the surface of the earth that minimizes the sum of distances to all the LEPs:

$$\text{fix}(leps) = \min_{(\phi,\lambda) \in S^2} \sum_{lep}^{leps} d(lep, (\phi, \lambda)), \quad (13)$$

where $S^2$ is the sphere. In some embodiments, only a subset of $S^2$, such as the part of the globe below the radio horizon of the platform, needs to be considered. The distance function, fix(leps), is the function described in Equation (12).

In practice other considerations may to be taken into account. It is not unusual to find that some AOA measurements are obviously incorrect. These outliers might be due to RF or EM interference, or flaws in the calibration table. The ability of the geo-engine to detect and ignore outliers is important.

The optimization algorithm must also be robust to the effects of noisy measurements. When used in the real world, noise and errors will enter into the algorithm from many sources. The actual RF measurements used to compute the cone angle are noisy, the calibration table has a discrete set of entries, navigation data (especially heading) is never exactly correct, etc.

Enclosed Appendix A includes supporting mathematical calculations known in the art, the entire contents of which are expressly incorporated by reference.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for determining geo position of a target by a geo-location engine onboard a moving aircraft, the geo-location engine including one or more processors, a receiver, and storage medium, the method comprising:
   receiving, by the receiver, navigation data of the moving aircraft including flight attitude of the moving aircraft, and an angle to the target, via an input signal;
   calculating, by the one or more processors, a locus of emitter positions (LEP) curve from the received navigation data, the flight attitude and the angle to the target, using a cone angle in a 3-D coordinate system and a single measurement of the flight attitude;
   repeating, by the one or more processors, steps (a) and (b), as the moving aircraft moves toward or away from the target;
   accumulating by the one or more processors, in the storage medium, the calculated LEP curves;
   determining, by the one or more processors, a position that is closest to all the accumulated LEP curves to establish a position of the target, wherein the position of the target is established regardless of the distance of the moving aircraft to the target, and regardless of aircraft position relative to the target; and
   transmitting the established position of the target to a navigation system.

2. The method of claim 1, wherein calculating the LEP curve further comprises converting, by the one or more processors, the received angle to a three-dimensional geometric model using the received navigation data; and electronically intersecting the three-dimensional geometric model with a three-dimensional geometric model of the earth to obtain the LEP curve.

3. The method of claim 2, wherein the angle comprises angle of arrival (AOA) information and the three-dimensional geometric model is a three-dimensional cone model.

4. The method of claim 2, wherein the three-dimensional geometric model of the earth is a sphere.

5. The method of claim 2, wherein the three-dimensional geometric model of the earth is an ellipsoid.

6. The method of claim 2, wherein the three-dimensional geometric model of the earth is determined using digital terrain data.

7. The method of claim 1, wherein the navigation data includes position, heading, pitch and roll data.

8. The method of claim 3, wherein the AOA is measured relative to the longitudinal axis of the aircraft.

9. The method of claim 8, wherein the AOA corresponds to an azimuth, and the cone is formed by sweeping through all elevation angles.

10. The method of claim 9, wherein an apex of the cone is the aircraft, and a central axis of the cone is a reference axis used for measuring AOA.

11. A system for determining geo position of a target by a moving aircraft comprising:
    a receiver for receiving navigation data related to the moving aircraft including flight attitude of the moving aircraft, and an angle to the target;
    one or more processors for calculating a locus of emitter positions (LEP) curve from the received navigation data, the flight attitude and the angle to the target, using a cone angle in a 3-D coordinate system and a single measurement of the flight attitude, wherein as the moving aircraft moves toward or away from the target, the receiver receives new navigation data and new angle to the target and said one or more processors calculate new LEP curves;
    a memory for accumulating the calculated LEP curves, wherein said one or more processors determine a position that is closest to all the accumulated LEP curves to establish a position of the target, and wherein the position of the target is established by said one or more processors regardless of the distance of the moving aircraft to the target, and regardless of aircraft position relative to the target; and
    an output logic circuit for transmitting the established position of the target to a navigation system.

12. The system of claim 11, wherein said one or more processors are configured to calculate the LEP curve by converting the received angle to a three-dimensional geometric model using the received navigation data; and intersecting the three-dimensional geometric model with a three-dimensional geometric model of the earth to obtain the LEP curve.

13. The system of claim 12, wherein the angle comprises angle of arrival (AOA) information and the three-dimensional geometric model is a three-dimensional cone model.

14. The system of claim 12, wherein the three-dimensional geometric model of the earth is a sphere.

15. The system of claim 12, wherein the three-dimensional geometric model of the earth is an ellipsoid.

16. The system of claim 12, wherein the three-dimensional geometric model of the earth is determined using digital terrain data.

17. The system of claim 11, wherein the navigation data includes position, heading, pitch and roll data.

18. The system of claim 13, wherein the AOA is measured relative to the longitudinal axis of the aircraft.

19. A method for determining geo position of a target by a geo-location engine onboard a moving aircraft, the geo-location engine including one or more processors, a receiver, and storage medium, the method comprising:

receiving, by the receiver, navigation data of the moving aircraft including flight attitude of the moving aircraft, and an angle to the target, via an input signal;

calculating, by the one or more processors, a locus of emitter positions (LEP) curve from the received navigation data, the flight attitude and the angle to the target, using a cone angle in a 3-D coordinate system and a single measurement of the flight attitude;

repeating, by the one or more processors, steps (a) and (b), as the moving aircraft moves toward or away from the target;

accumulating by the one or more processors, in the storage medium, the calculated LEP curves;

determining, by the one or more processors, a position that is closest to all the accumulated LEP curves to establish a position of the target, wherein the position of the target is established regardless of the distance of the moving aircraft to the target, and regardless of aircraft position relative to the target; and transmitting the established position of the target to a target acquisition system.

\* \* \* \* \*